US006989410B2

(12) United States Patent
Hamilton et al.

(10) Patent No.: US 6,989,410 B2
(45) Date of Patent: Jan. 24, 2006

(54) PROCESSES FOR PREPARING MULTIMODAL POLYMER PARTICLE COMPOSITIONS

(75) Inventors: Raymond Gerard Hamilton, Washington Crossing, PA (US); Morris Christopher Wills, Philadelphia, PA (US); Kirk Harold Moyer, Yardley, PA (US); Jennifer Lynn Petoff, Yardley, PA (US); Joseph Robert Adamo, Souderton, PA (US)

(73) Assignee: Rohm and Haas Company, Philadelphia, PA (US)

( * ) Notice: Subject to any disclaimer, the term of this patent is extended or adjusted under 35 U.S.C. 154(b) by 421 days.

(21) Appl. No.: 10/307,650

(22) Filed: Dec. 2, 2002

(65) Prior Publication Data

US 2003/0125420 A1 Jul. 3, 2003

Related U.S. Application Data

(60) Provisional application No. 60/340,566, filed on Dec. 14, 2001.

(51) Int. Cl.
*C08J 3/00* (2006.01)
*C08L 51/00* (2006.01)
(52) U.S. Cl. ............... 523/340; 523/342; 524/321; 524/504; 524/804
(58) Field of Classification Search ............... 523/340, 523/342; 524/321, 804, 504
See application file for complete search history.

(56) References Cited

U.S. PATENT DOCUMENTS

| 4,456,726 A | 6/1984 | Siol et al. |
| 4,461,869 A * | 7/1984 | Yang ..................... 525/80 |
| 4,539,361 A | 9/1985 | Siol et al. |
| 5,334,658 A | 8/1994 | Blumenstein et al. |
| 5,344,675 A | 9/1994 | Snyder |
| 6,673,451 B2 * | 1/2004 | Bardman et al. ...... 428/402.22 |
| 2002/0032268 A1 * | 3/2002 | Weitzel ..................... 524/460 |

FOREIGN PATENT DOCUMENTS

| CA | 1256645 | 6/1989 |
| WO | 01/48044 A | 7/2001 |

* cited by examiner

*Primary Examiner*—Tae H. Yoon
(74) *Attorney, Agent, or Firm*—Marcella M. Bodner; Paul S. Chirgott

(57) ABSTRACT

A multimodal polymer particle composition containing two or more populations of polymer particles having a total rubbery weight fraction of less than 90 weight percent is provided. Also disclosed is a process for preparing multimodal polymer particle compositions that can be dried to a powder. Multimodal polymer particle dispersions are disclosed for preparing impact modifiers that can be dried to a powder. Also provided are polymeric compositions having a matrix resin component and impact modifiers prepared from multimodal polymer particles.

10 Claims, No Drawings

PROCESSES FOR PREPARING MULTIMODAL POLYMER PARTICLE COMPOSITIONS

CROSS REFERENCE TO RELATED PATENT APPLICATIONS

This is a non-provisional application of prior pending U.S. provisional application Ser. No. 60/340,566 filed Dec. 14. 2001.

BACKGROUND OF THE INVENTION

This invention relates to multimodal polymer particle compositions having at least two populations of polymer particles that are useful as impact modifiers. This invention also relates to plastics additive polymer particle dispersions having at least two populations of polymer particles that can be formed into a powder. This invention further relates to a process for preparing multimodal polymer particle compositions having at least two populations of polymer particles that are useful as impact modifiers. This invention even further relates to polymeric compositions that include a polymeric component and one or more impact modifiers prepared from multimodal polymer particle compositions.

As used herein, the term "multimodal polymer particle composition" refers to a composition having at least two populations of polymer particles, a "larger mode" and a "smaller mode", wherein the at least two populations of polymer particles differ in mean particle size by at least 50 percent. Optional additional modes may have mean particle sizes even larger than the "larger mode" as well as smaller than the "small mode".

Numerous molded articles and films are manufactured from one or more of a variety of polymeric resins. Oftentimes, these resins by themselves are brittle and do not possess suitable impact strength required by the end use for which they are made. To overcome their shortcomings, resins, especially poly(vinyl chloride), hereinafter "PVC", are generally blended with plastics additives that improve impact strength. Such plastics additives are typically known in the industry as impact modifiers and are often supplied in a powder form.

Many impact modifiers are based on polymer particles that contain a majority amount of a soft rubbery polymer phase (e.g., core) surrounded by a hard polymer phase (e.g., shell), herein referred to as "core-shell" polymer particles. While the rubbery core polymer contributes to the toughening effect of the impact modifier, it is inherently soft and sticky and generally cannot be isolated neatly as a dry powder. The hard shell therefore surrounds the sticky core polymer and enables one to isolate the core-shell polymer particles as a dry powder.

For improving process economics and properties, polymer particles can be prepared using emulsion polymerization techniques to create a bimodal distribution of particle sizes (e.g., a "smaller mode" and a "larger mode"). Such bimodal distributions enable the preparation of polymer particle dispersions at high solids (e.g., typically at least 50 weight percent) at practicable process viscosities (e.g., typically below about 2000 centipoise, "cPs").

Spray drying is an economical, safe and desirable means of isolating dispersions of polymer particles as free-flowing powders. During this process, an aqueous dispersion of polymer particles is atomized in a chamber containing heated air, water is removed, and the polymer particles are aggregated into dry powder particles.

While spray-drying is useful for preparing dry powders from non-rubbery (high Tg) polymer particle dispersions that are low in viscosity, there are several problems associated with spray drying polymer particle dispersions having high solids, high viscosities, and which are composed primarily of a soft, rubbery polymer phase. These problems include: (1) sticking of the particles to the chamber walls of the spray dryer; (2) bridging of the particles over conveying lines entrances; and (3) unacceptable powder flow characterized by aggregation, clumping, and flow interruptions.

It has previously been unrealizable to prepare and dry high solids rubber-containing multimodal polymer particle dispersions having a "smaller mode" mean particle size that exceeds 200 nm.

Canadian Patent 1,256,645 discloses bimodal polymer particle dispersions having up to 65 percent solids weight fraction. These dispersions, which are prepared by various emulsion polymerization techniques, are disclosed to reduce energy requirements and to achieve an increase in productivity in the production of powders by spray drying. While the disclosed polymer particle dispersions are composed in large measure of acrylic monomers and have a glass transition temperature of at least 45° C., this patent does not address the aforementioned problems associated with spray drying polymer particles composed of a majority of a soft, rubbery polymer phase.

A problem addressed by the present invention is to provide multimodal polymer particle compositions having a soft rubber majority phase, and having a smaller mode of average particle size of greater than 200 nm, which have practicable process viscosities at solids weight fractions of at least 50 weight percent. The term "practicable process viscosities" refers to the ability to prepare polymer particle dispersions by emulsion polymerization techniques and to dry (e.g., by spray drying) such dispersions into a powder. We have now discovered that certain multimodal polymer particle compositions can be readily prepared by emulsion polymerization and dried into a powder.

We have surprisingly discovered that such multimodal polymer particle compositions are provided as polymer particles that contain two or more populations ("modes") of polymer particles that vary in mean particle size, wherein the mean particle sizes of the two populations vary by at least 50 percent, and the smaller mode has a mean particle diameter of greater than 200 nm. In addition, we have surprisingly discovered that multimodal polymer particle dispersions containing up to 95 weight percent total rubbery component, based on total polymer particle weight, can be readily spray-dried to compact free powders when the polymer particles are prepared via a "gradual addition" (as opposed to a "shot monomer addition") free-radical emulsion polymerization addition. We have also discovered that these new multimodal polymer particles are useful as additives for plastics, and are especially useful as impact modifiers when they contain at least 70 weight percent of a rubbery component.

STATEMENT OF THE INVENTION

Accordingly, one object of the present invention is to provide a multimodal polymer particle composition, comprising:
(a) a larger mode of polymer particles, and
(b) a smaller mode of polymer particles,
wherein the mean particle size of the larger mode of polymer particles is at least 50 percent larger than the mean particle size of the smaller mode of particles, said smaller mode of polymer particles having a mean particle size of greater than 200 nm, and wherein the total rubbery weight fraction of the larger and smaller modes of polymer particles is at most 90 weight percent.

Another object of the present invention is to provide a multimodal polymer particle dispersion, comprising:

(a) water, and (b) polymer particles, the polymer particles comprising:
(i) a larger mode of polymer particles, and
(ii) a smaller mode of polymer particles,
wherein the mean particle diameter of the larger mode of polymer particles is at least 50 percent larger than the mean particle diameter of the smaller mode of particles, said smaller mode of polymer particles having a mean particle size of greater than 200 nm,
and wherein the total rubbery weight fraction of the larger and smaller modes of polymer particles is at most 90 weight percent.

Yet another object of the present invention is to provide a polymeric composition, comprising:

(a) a matrix resin component, and (b) an impact modifier, the impact modifier comprising,
(i) a larger mode of polymer particles, and
(ii) a smaller mode of polymer particles,
wherein the mean particle diameter of the larger mode of polymer particles is at least 50 percent larger than the mean particle diameter of the smaller mode of particles, said smaller mode of polymer particles having a mean particle size of greater than 200 nm,
and wherein the total rubbery weight fraction of the larger and smaller modes of polymer particles is at most 90 weight percent.

A further object of the present invention is to provide a process for preparing a multimodal polymer particle composition, comprising the steps of:

(I) providing a multimodal polymer particle dispersion, said dispersion comprising:
(a) a larger mode of polymer particles, and
(b) a smaller mode of polymer particles,
wherein the mean particle size of the larger mode of polymer particles is at least 50 percent larger than the mean particle size of the smaller mode of particles, said smaller mode of polymer particles having a mean particle size of greater than 200 nm,
and wherein the total rubbery weight fraction of the larger and smaller modes of polymer particles is at most 90 weight percent; and (II) drying the multimodal polymer particle dispersion.

An additional object of the present invention is to provide a process for preparing a high-rubber, high-solids multimodal polymer particle powder, comprising the steps of:

(I) preparing a high-rubber high-solids multimodal polymer particle dispersion using a gradual addition polymerization method, said dispersion comprising:
(a) a larger mode of polymer particles, and
(b) a smaller mode of polymer particles,
wherein the total rubbery weight percentage of the polymer particles is up to 95 percent, based on total weight of polymer particles,
wherein the total solids weight fraction of the dispersion is at least 50 weight percent,
and wherein the mean particle size of the larger mode of polymer particles is at least 50 percent larger than the mean particle size of the smaller mode of particles; and (II) spray-drying the multimodal polymer particle dispersion to a compaction-free powder.

These and other objects, as will become apparent from the following disclosure, are achieved by the various embodiments of the present invention set out below.

DETAILED DESCRIPTION OF THE INVENTION

The term "rubbery" used herein denotes the thermodynamic state of a is polymer above its glass transition temperature.

The term "units derived from" used herein refers to polymer molecules that are synthesized according to known polymerization techniques wherein a polymer contains "units derived from" its constituent monomers.

The term "molecular weight" used herein refers to the weight average molecular weight of polymer molecules as determined by the gel permeation chromatography method.

The term "graftlinker" used herein refers to multi-functional monomers capable of forming multiple covalent bonds between polymer molecules of one type with polymer molecules of another type.

The term "crosslinker" used herein refers to multi-functional monomers capable of forming multiple covalent bonds between polymer molecules of the same type.

The term "alkyl (meth)acrylate" used herein refers to both alkyl acrylate and alkyl methacrylate monomer compounds.

The term "resin" used herein refers to both thermoplastic resin and thermosetting resins.

The term "stage" used herein is intended to encompass its broadest possible meaning, including the meaning conveyed in prior art such as in U.S. Pat. No. 3,793,402; U.S. Pat. No. 3,971,835; U.S. Pat. No. 5,534,594; and U.S. Pat. No. 5,599,854; which offer various means for achieving "staged" polymers.

The term "parts" used herein is intended to mean "parts by weight". Unless otherwise stated, "total parts by weight" do not necessarily add to 100.

The term "weight percent" used herein is intended to mean "parts per hundred by weight" wherein the total parts add to 100.

The term "weight fraction" used herein is synonymous with "weight percentage", when it is evident that the total parts described add to 100.

The term "solids weight fraction" used herein is intended to mean the weight percentage of the dried residue based on the total weight of an aqueous particle dispersion that is dried to constant weight.

The term "particle size" used herein refers to the mean particle size of a population of particles determined on a weight average basis by capillary hydrodynamic flow fractionation ("CHDF").

The term "mode" used herein refers to a particular population of particles as in "larger mode" and "smaller mode".

The term "core-shell" used herein refers to polymer particles which typically have at least one outer polymer phase externally situated adjacent to an inner polymer phase; the outer phase may be situated as a single phase (shell) or as multiple phases (islands) on the inner polymer phase (core).

The term "first population" and "second population" used herein is for the sake of convenience in identifying two different populations of polymer particles and has no connotation relating to process order.

The term "compaction-free" used herein refers to powdery compositions, which are not compactable into a single mass by manually squeezing a handful of the powdery composition.

The term "nm" used herein refers to nanometers.

All ranges defined herein are inclusive and combinable.

The Fox Equation as used herein is:

$$1/Tg=a/Tg(A)+b/Tg(B)+c/Tg(C)+ \qquad \text{[EQUATION 1]}$$

wherein a, b, c, etc. refer to the weight fraction of monomeric components A, B, C, etc. respectively, and Tg(A), Tg(B), Tg(C), etc. refer to the glass transitions for the homopolymers derived from monomers A, B, C, etc., expressed in degrees Kelvin. Temperature in degrees Celsius (C) equals temperature in degrees Kelvin (K) plus 273.15.

As will be set out below, the embodiments of this invention pertain to various aspects of a multimodal polymer particle composition that includes a smaller mode having a mean particle size of greater than 200 nm and a larger mode having a mean particle size of at least 50 percent larger than that of the smaller mode, methods of making such multimodal polymer particles, and plastic compositions that include such multimodal polymer particles.

Among other things, this invention resolves at least some of the problems associated with preparing impact modifier powders from multimodal polymer particle dispersions having a solids concentration of at least 50 weight percent, and a rubbery content of up to 90 weight percent, and a viscosity less than 2000 centipoise. This is accomplished by the development of novel multimodal polymer particle compositions that include a smaller mode having a mean particle size of greater than 200 nm and a larger mode having a mean particle size of at least 50 percent larger than that of the smaller mode. The novel multimodal polymer particle compositions can be prepared by emulsion polymerization techniques and dried to a powder. Preferably, the novel multimodal polymer particle compositions are spray dried with a suitable flow aid to reduce powder compaction.

In one embodiment of the present invention, there is provided a novel multimodal polymer particle composition that includes a larger mode of polymer particles and a smaller mode of polymer particles. In this embodiment, the total rubbery weight fraction of the larger and smaller modes of polymer particles is not greater than 90 weight percent. In this embodiment, the mean particle size of the larger mode of polymer particles is at least 50 percent larger than the mean particle size of the smaller mode of particles, in which the smaller mode of polymer particles has a mean particle size of greater than 200 nm.

In another embodiment of the present invention, there is provided a novel multimodal polymer particle dispersion that includes water and polymer particles, wherein the polymer particles include at least a larger mode of polymer particles, and a smaller mode of polymer particles, wherein the total rubbery weight fraction of the larger and smaller modes of polymer particles is not greater than 90 weight percent. In this embodiment, the mean particle size of the larger mode of polymer particles is at least 50 percent larger than the mean particle size of the smaller mode of particles, in which the smaller mode of polymer particles has a mean particle size of greater than 200 nm. In this embodiment, the size differences among the larger and smaller modes afford the following advantages over comparable single population impact modifiers: improved powder flow properties (less compaction), possibility of high solids (improved process efficiency), low water content (for advantages in subsequent water removal step), and/or lower in-process viscosity (for improved spray-drying).

In yet another embodiment of the present invention there is provided a process for preparing a multimodal polymer particle composition wherein the total rubbery weight fraction of the core-shell polymer particles of the composition is not greater than 90 weight percent. The process encompassed by this embodiment includes at least the following steps. First, a polymer particle dispersion is provided that includes a larger mode of polymer particles and a smaller mode of polymer particles. Then, the polymer particle dispersion is dried. In this embodiment, the mean particle size of the larger mode of polymer particles is at least 50 percent larger than the mean particle size of the smaller mode of particles, in which the smaller mode of polymer particles has a mean particle size of greater than 200 nm.

In a further embodiment of the present invention, there is provided a novel polymeric composition which includes a matrix resin component and a core-shell impact modifier, wherein the total rubbery weight fraction of the of the impact modifier is no greater than 90 weight percent. In this embodiment, the impact modifier is composed of multimodal polymer particles that include a larger mode of polymer particles, and a smaller mode of polymer particles, wherein the mean particle size of the larger mode of polymer particles is at least 50 percent larger than the mean particle size of the smaller mode of particles, wherein the particle size of the smaller mode is greater than 200 nm. In this case, the size differences among the larger and smaller modes of particles afford the following specific advantages over single population particles: improved impact properties and reduced dust problems.

In these embodiments of the present invention, the dryable multimodal polymer particle dispersions are optionally spray dried with a flow aid to make compaction-free powders.

Various means can be used to produce the multimodal polymer particle dispersions of the present invention which contain multimodal polymer particles containing no more than 90 weight percent rubbery component and having practicable process viscosities. One example of a suitable means for providing such high rubber spray-dryable dispersions is to employ as part of the polymer particles at least two differently-sized populations of polymer particles when the particle size of the larger mode is at least 50 percent larger than that of the smaller mode of particles, and the smaller mode of polymer particles has a mean particle size of greater than 200 nm. In instances where even lower process viscosities are desirable, the particle size of the larger mode of particles is at least 100 percent larger than that of the second; more typically at least 200 percent larger than that of the smaller mode; and even more typically at least 250 percent larger than that of the smaller mode.

Typically, the particle size of the larger mode of particles is at least 350 nm, more typically at least 420 nm, and even more typically at least 500 nm. However, problems in impact strength can arise when the larger mode particle size is too large. Accordingly, when practicing this invention, the particle size of the larger mode is typically at most 10,000 nm, more typically at most 1000 nm, and even more typically at most 800 nm.

However, it has also been observed that viscosity problems arise when the smaller mode particle size is too small. Accordingly, when practicing this invention, the particle size of the smaller mode should be greater than 200 nm; typically at least 210 nm; more typically at least 230 nm; and even more typically at least 260 nm. These smaller mode particle sizes are particularly preferred for preparing multimodal polymer particles, which are useful as impact modifiers. However, it has also been observed that impact problems arise when the smaller mode particle size is too large. Accordingly, when practicing this invention for preparing impact modifiers, the particle size of the smaller mode should be at most 5,000 nm, typically at most 500 nm, and more typically at most 400 nm.

Although the present invention does not require a particular solids weight fraction of the dispersion, it has been observed that there are certain process and economic advantages associated with having a polymer concentration greater than 25 weight percent. Accordingly, when practicing this invention, the solids weight fraction of the dispersion is typically at least 25 weight percent; more typically at least 40 weight percent; and even more typically, at least 50 weight percent. While the solids weight fraction is typically less than the theoretical limit of about 87 weight percent, the solids weight fraction is typically less than 80 weight percent, more typically less than 75 weight percent, even more typically less than 70 weight percent, and further typically less than 65 weight percent.

Combinations of two polymer populations which vary in particle size are describable using three main variables: weight percent of larger population "mode", particle size of the larger mode, and particle size of the smaller mode. Diameter Ratio (DR) is equal to the diameter of the larger mode (Dlarge) divided by the diameter of the smaller mode (Dsmall). From a theoretical standpoint, the optimum value of DR for maximizing packing density ranges from 7 to 10.

In comparison to randomly packed ideal single mode spheres which has a packing factor of 0.639, a combination of larger mode and smaller mode spheres having a DR of 10 theoretically provides a packing factor of 0.835, while a DR of infinity theoretically provides 0.870.

While not bound to any particular theory, it is commonly thought that to achieve the maximum packing factor for a combination of larger mode and smaller mode polymer particles, the weight percent of the larger polymer particles should be 73.5 percent. While this theoretical value is for an ideal system for merely maximizing the packing effects, the weight percent of the larger polymer particles may vary depending on properties provided by the polymer particles.

Impact modifiers tend to provide better impact strength to polymeric resins as the particle size decreases, thus the weight percent of larger impact modifier polymer particles may be best less than 73.5 percent. Accordingly, when practicing the present invention, the weight percent of the larger mode particles is typically less than 90 percent, more typically less than 85 percent, and even more typically less than 80 percent, based on total weight of polymer particles in the multimodal dispersion. In addition, the weight percent of the larger mode particles is typically greater than 10 percent, more typically greater than 15 percent, and even more typically greater than 20 percent, based on total weight of all polymer particles in the multimodal dispersion. In a preferred embodiment, the weight percent of the larger mode particles is not in the range of from 40 to 60 weight percent, based on the total weight of only the smaller mode and larger mode polymer particles in the multimodal dispersion.

Optional additional modes even smaller than the smaller mode can be present up to 20 weight percent, typically up to 15 weight percent, more typically up to 10 weight percent, and even more typically up 5 weight percent, based on total weight of all polymer particles in the multimodal dispersion.

In addition, a combination of three or more populations of polymer particles that vary in particle size can provide further increases in the packing fraction beyond the theoretical value of 87 percent for two populations of polymer particles. Further increases in packing fraction are expected as the interstitial spaces in the two-population system are further filled by particles even smaller than the smaller mode.

In preparing multimodal polymer particle dispersions of the present invention, it is desirable that the viscosity of the multimodal polymer particle dispersion should be no more than 10,000 centipoise, typically no more than 2,000 centipoise, more typically no more than 1,750 centipoise, and even more typically no more than 1,500 centipoise.

In providing powdery impact modifiers of the present invention by spray drying multimodal polymer particle dispersions, it is desirable that the viscosity of the multimodal polymer particle dispersion should be no more than 2,000 centipoise, typically no more than 1,750 centipoise, more typically no more than 1500 centipoise, and even more typically no more than 1,250 centipoise. These viscosities are determined using a Brookfield viscometer with a #3 spindle operating at 30 RPM. Polymer particle dispersions that have viscosities greater than 2,000 centipoise can be suitably diluted, such as by addition of an aqueous liquid, to reduce the viscosity to 2,000 centipoise or less. As well, surfactants may also be added to these polymer particle dispersions to improve their shear stability. Accordingly, a high solids multimodal polymer particle dispersion provides a much lower viscosity than a high solids polymer particle dispersion having a single population of comparable polymer particles. Hence, high solids multimodal polymer particle dispersions of the present invention are more readily spray dried than comparable high solids single population particle dispersions.

In one preferred embodiment for providing multimodal polymer particles at weight percent solids in the range of 60 to 70 weight percent which are useful for spray drying into multimodal polymer particle powders that can be used as impact modifiers, it is desirable that the mean particle size of the smaller mode is in the range of from 250 to 300 nm, and the larger mode is in the range of from 550 to 650 nm.

The particles of the impact modifier's core-shell polymer particles are typically spherically shaped. However, they can have any suitable shape. Various shapes of core-shell polymer particles can be prepared by processes known in the art of polymer particle technology. Examples of such suitable shapes of particles include: rubbery core/hard shell inhomogeneous particles, hard shell/rubbery core particles, particles having more complex (e.g. three-stage, soft/soft/hard, soft/hard/soft, hard/soft/hard; four-stage soft/hard/soft/hard, etc.) morphologies; ellipsoidal particles having an aspect ratio greater than 1:1; raspberry-shaped particles; multi-lobe-shaped particles; dumbbell-shaped particles; agglomerated particles; bilobal particles; and hollow sphere particles.

The multimodal polymer particle compositions of the present invention may also be used as processing aids. Moreover, the multimodal polymer particle compositions of the present invention that are useful as impact modifiers may also contain polymer particles that are useful as processing aids.

Typical processing aids have polymer compositions exhibiting a glass transition ("Tg") higher than 25° C. Typical processing aids have polymer compositions with molecular weights ("MW") greater than 1 million g/mol. More typically, processing aids have molecular weights greater than 3 million g/mol. In certain applications, such as preparing PVC foam, processing aids may have molecular weights greater than 6 million, and even greater than 10 million. These processing aids may also comprise multimodal polymer particles according to the present invention.

Optionally, the multimodal polymer particle compositions of the present invention may also include other plastics additives, including: waxes; pigments; opacifiers; fillers; exfoliated clays; toners; antistatic agents; metals; flame retardants; thermal stabilizers; co-stabilizers; antioxidants; cellulosic materials; other impact modifiers; lubricating processing aids; internal lubricants; external lubricants; oils; rheology modifiers; powder flow aids; melt-flow aids; dispersing aids; UV stabilizers; plasticizers; fillers; optical modifiers; surface roughness modifiers; surface chemistry modifiers; adhesion modifiers; surface hardeners; compatibilizers; diffusion barrier modifiers; stiffeners; flexibilizers; mold release agents; processing modifiers; blowing agents; thermal insulators; thermal conductors; electronic insulators; electronic conductors; biodegradation agents; antistatic agents; internal release agents; coupling agents; flame retardants; smoke-suppressers; anti-drip agents; colorants; and combinations thereof.

In one embodiment of the present invention, the aforementioned plastics additives can be added directly to the multimodal polymer particle dispersions. In other embodiments of the present invention, the aforementioned plastics additives can be subsequently added to the dried powders of the present invention by various powder processes such as: powder post-blending; co-spray drying; and co-agglomeration. Accordingly, the compositions of the present invention are useful as any type of plastics additives described herein.

When practicing this invention for preparing compositions useful as impact modifiers, the weight percentage of rubbery component of the multimodal polymer particles is greater than 50 weight percent; typically at least 60 weight percent; more typically at least 70 weight percent; and even more typically at least 80 weight percent. Accordingly, the weight percentage of rubbery component of the particles is less than 90 weight percent; typically no more than 88 weight percent, and more typically no more than 85 weight percent.

Various processes useful for drying the multimodal polymer particle dispersions include fluidized bed dryers, rotary dryers, continuous or batch tray dryers, flash dryers, and pneumatic conveying dryers, and preferably spray driers. During the drying step it is important to control the drying temperature so that the particles do not fuse among themselves, for example by keeping the temperature of the polymer particles below the Tg of their hard polymer components (e.g., outer shells of core-shell polymer particles). If the drying temperature is too high then the individual polymer particles may fuse together in the powder particles, which may hinder their subsequent dispersion into thermoplastic matrices. A free-flowing, low-dust plastics additives powder is achieved when the water content is less than 5%, preferably less than 3%, most preferably less than 1%.

For the purposes of preparing multimodal polymer particle powders of the present invention that are compaction-free, it is desirable to dry the multimodal polymer particle dispersions with a flow aid. Accordingly, the weight percentage of flow aid in the compaction-free impact modifier powders of the present invention is typically greater than 0.5 weight percent; more typically greater than 1 weight percent; and even more typically, greater than 1.5 weight percent. Likewise, the weight percentage of flow aid in the powdery impact modifier is typically no more than 10 weight percent; more typically no more than 8 weight percent; and even more typically no more than 5 weight percent. The aforementioned weight percentages are based on the total dry weight of the powder, which includes the polymer particles and the flow aid. If more than one type of flow aid is used to dry the dispersion, then the aforementioned flow aid weight percentages refer to the total weight percentages of all flow aids used.

Although higher levels of flow aid may help achieve the desired improved drying and flow characteristics, higher amounts of flow aid typically reduce the impact efficiency. It is therefore desirable to incorporate only the minimum amount of flow aid when a compaction-free powder is desired. Typically, a compaction-free powder is more desirable than a powder that is not compaction-free.

Spray drying can be conducted in any of a variety of designs. The multimodal polymer particle dispersion is atomized either by a wheel or by a nozzle, and the drying gas can enter from the top or the bottom of the atomization chamber. The drying gas is typically heated air or nitrogen to provide a powder temperature that is between the outlet temperature and wet bulb temperature of the drying gas. For acrylic core-shell polymer compositions of the present invention, powder temperatures are maintained less than 80° C., typically less than 65° C., and more typically less than 55° C. to provide free-flowing powders. Likewise, powder temperatures are maintained greater than 20° C., typically greater than 30° C., and more typically greater than 40° C. to provide free-flowing powders at efficient production rates.

In the spray drying process, optional flow aid may be blown into the atomization chamber by a separate gas stream or fed into the atomization chamber at such a rate to give the desired weight percentage based on total polymer particles and flow aid.

The flow aid is typically an inert particulate material having a particle size in the range of from 0.005 to 10 microns. Both organic and inorganic flow aids may be used in the present invention. Many suitable flow aids are commercially available. Organic flow aids typically include hard polymer particles having softening temperature greater than that of the spray drying conditions (e.g., polymethyl methacrylate). Flours from plant products such as cellulose fiber, wood and nutshells may also be incorporated as flow aids. Suitable inorganic flow aids typically include a variety of compositions, e.g.: glass beads; metals, minerals such as calcium carbonates, alumina trihydrates, micas, magnesium carbonates, magnesium hydroxide; talcs; clays such as alumina silicates; ceramics; precipitated amorphous silica; fumed silica; diatomaceous earth, pigments such as titanium dioxide. Both stearic acid coated and uncoated calcium carbonate flow aids are typically used as flow aids. Various particulate compositions known as "anti-blocking agents" and "fillers" are also useful as flow aids. It is desirable that the flow aids are chemically inert and substantially non-reactive with any of the other components commonly found in plastics compositions at process conditions.

The dried powders of the present invention are characterized by having a mean particle size of at least 10 microns; typically at least 25 microns; more typically at least 50 microns; and even more typically at least 100 microns. Spray dried powders of the present invention are characterized by having a mean particle size of at most 1000 microns; typically at most 750 microns; more typically at most 500 microns; and even more typically at most 250 microns. Powder particles larger than 1000 microns are typically undesirable, and are subsequently filtered out of the multimodal polymer particle product.

Spray-dried powders provided by the present invention are typically characterized as free flowing and low-dust. Typically, these powder properties are achieved when the water content is less than 15 weight percent, typically less than 10 weight percent, more typically less than 5 weight percent, even more typically less than 3 weight percent, and most typically less than 1 weight percent.

One variation of the process of the present invention includes having optional step(s) for adding one or more other known plastic additive compositions, in either powder or aqueous form during. These other additives can be optionally blended into the composition before, during, or after the final spray-drying step using standard equipment such as high-speed mixers, blenders, kneaders, extruders, and fluidized drying beds. Other ingredients typically blended in thermoplastic formulations, such as lubricants, thermal stabilizers, waxes, dyes, pigments, fillers, may each have an aqueous solution, liquid, powdered, or pellet form, and may also be included in the present invention using this mixing equipment.

The two or more populations of the polymer particles used in the present invention can be provided for in a number of ways known in the art of polymer science. One method involves blending two or more distinct polymer particle dispersions, e.g., those prepared by emulsion polymerization, each having their own particle size; and in-situ formation and polymerization of a second particle population in the presence of a previously polymerized particle population. In another method, free radical emulsion polymerization techniques may be used while providing polymer seeds at different points in the process to provide for multimodal polymer particles.

In the processes for preparing the polymer particle dispersions as provided herein, it is typical that the weight percentage of the polymer particles is at least 25 weight percent; and more typically at least 40 weight percent, and even more typically at least 50 weight percent. Commercially-efficient processes will have a weight percentage of at least 55 weight percent. In the processes for preparing polymer particle dispersions having viscosities below 10,000 centipoise as provided herein, it is typical that the weight percentage of the polymer particles is no more than 80 weight percent; and more typically no more than 75 weight percent, and even more typically no more than 70 weight percent, and further typically no more than 65 weight percent.

Multimodal polymer particles can also be provided by an emulsion polymerization process in which a second (or subsequent) population of polymer particles is created in the presence of a first (or previous) population. The following procedure is illustrative: Starting with at least one seed polymer particle population in a reaction mixture, add additional surfactant, and add a portion of a monomer mixture and initiator to form a second (or subsequent) population of polymer particles of different size. Next, polymerize the remaining monomers in the monomer mixture to result in at least two populations of polymer particles that have mean particle sizes that vary by more than 50 percent so that the smaller mode particle size is greater than 200 nm.

When the multimodal polymer particle dispersion is in an emulsion form, the dispersion may further contain surfactants, emulsifiers, stabilizers, ionic salts, acid or base, oligomeric species, oils, as well as other plastics additives described herein. In an emulsion form, the polymer particles are typically synthesized by an emulsion process or prepared by an alternative polymerization process and then subsequently emulsified. More typically, the polymer particles are prepared using emulsion polymerization techniques using various ethylenically unsaturated monomers such as those based on acrylics, dienes, vinyl-halides, vinyl aromatics, ethylene-vinyl acetates, and combinations thereof.

The multimodal polymer particle dispersions may also be provided using a process requiring at least two steps of (a) providing an aqueous emulsion polymerization reaction mixture comprising a first population of polymer particles and a second population of polymer particles; and (b) polymerizing a first group of one or more ethylenically unsaturated monomers in the aqueous emulsion polymerization reaction mixture so that at least one of said populations of polymer particles increases in mean particle size. Although this process requires that after a portion of the first group of one or more ethylenically unsaturated monomers is polymerized the mean particle sizes of the first and second populations of polymer particles differ by at least 50 percent, it is typical that the mean particle sizes differ by at least 100 percent, and more typical that the mean particle sizes differ by at least 200 percent.

The multimodal polymer particle dispersion may also be provided using a process related to the previously described process. This related process requires at least the two steps of (a) providing an aqueous emulsion polymerization reaction mixture comprising a first population of polymer particles and a second population of polymer particles; and (b) polymerizing a first group of one or more ethylenically unsaturated monomers in the aqueous emulsion polymerization reaction mixture to form a third population of polymer particles, wherein after a portion of the first group of one or more ethylenically unsaturated monomers is polymerized. Although this process requires that after a portion of the first group of one or more ethylenically unsaturated monomers is polymerized the mean particle sizes of the first and second populations of polymer particles differ by at least 50 percent, it is typical that the mean particle sizes differ by at least 100 percent, more preferable that the mean particle sizes differ by 200 percent.

In the aforementioned processes, the first and second populations of polymer particles in the aqueous emulsion polymerization reaction mixture of step (a) can be provided by a dispersion combination of the first and second populations of polymer particles. In this case, the dispersion combination may be provided by combining separate dispersions of the first and second populations of polymer particles.

In the aforementioned processes, the first and second populations of polymer particles in the aqueous emulsion polymerization reaction mixture of step (a) can also be provided by a dispersion combination of the first and second populations of polymer particles. In this case, the dispersion combination may be provided by forming one of the populations of polymer particles in a dispersion of the other population of polymer particles.

In the aforementioned two processes, the first and second populations of polymer particles in the aqueous emulsion polymerization reaction mixture of step (a) are provided by a dispersion combination of the first and second populations of polymer particles, wherein the dispersion combination is provided by forming substantially simultaneously the first and second populations of polymer particles in a dispersion.

In processes where the two populations of polymer particles are present, both populations may grow in size during step (b). Likewise, in the embodiment where a third (or more) population(s) of polymer particles forms, at least one of the first and second populations of polymer particles may grow in size during step (b), however it is possible that both the first and second populations may grow in size during step (b) during formation of the third population of polymer particles. This may be accomplished, when after making the second mode using the surfactant addition, more surfactant is added to make the third population of polymer particles.

In another process for providing the multimodal polymer particle dispersion used in the present invention, three or more polymer seed particles can be provided to the reaction mixture. One specific embodiment is where a third polymer seed particle is added to the first two. Multi-populations of polymer particles can also be prepared using even more polymer seed particles.

Accordingly, two-population and three-population multimodal polymer particle dispersions can be provided wherein at least one of the first and second populations of polymer particles substantially does not grow in size during step (b). This can be provided where one of the polymer particles is not soluble with monomer, e.g, providing highly crosslinked polymer particles or selecting polymer types which are not soluble with monomer. Alternatively, if the rate of polymerization in one seed population is substantially faster than in a second seed population, then (for kinetic reasons) the second population would typically not grow under these conditions.

As well, in the three-population process, both the first and second populations of polymer particles typically do not grow in size during step (b). As discussed above, it is possible to provide two populations of polymer particles, which do not grow in size, however the addition of extra surfactant provides an additional one or more modes that can grow in size. Alternatively, an independent mode can be prepared using larger swollen particles and smaller emulsion polymer particles so that independent polymerizations in two different modes result. Other combinations of growing and non-growing polymer particles can provide various populations of polymer particles.

In both of these processes for making a multimodal polymer particle dispersion having two and three particle populations, the weight fraction of the first population of polymer particles based on total polymer particle weight is at least 5 weight percent, typically at least 10 weight percent, more typically at least 15 weight percent, and even more typically at least 20 weight percent. Likewise, the weight fraction of the second population of polymer particles based on total polymer particle weight is at least 5 weight percent, typically at least 10 weight percent, more typically at least 15 weight percent, and even more typically at least 20 weight percent. Typically, the smaller population weight fraction is at least 20 weight percent based on total weight of polymer particles. Typically, the smaller population weight fraction is at most 60 weight percent based on total weight of polymer particles.

In the multimodal polymer particle dispersion having either two or three particle populations, the chemical compositions of the polymer particles in the larger and smaller modes are substantially the same, or different. They also can be substantially physically the same or different. An example of a physical difference is wherein the ethylenically unsaturated monomers form a polymer having different glass transition temperatures (Tg) according to the Fox equation. Typically, rubbery polymers have a Tg less than 25° C. For providing polymer Tg less than 25° C., typical monomers include: C1 to C18 alkyl acrylates such as butyl acrylate, ethyl acrylate, 2-ethylhexyl acrylate; diene monomers; vinyl acetate monomers; and copolymers thereof. Various other ethylenically unsaturated monomers that can be used in providing polymer Tg less than 25° C. are listed in *The Polymer Handbook*, cited herein.

In the multimodal polymer particles used in the present invention, the ethylenically unsaturated monomers used to form an outer polymer phase forms a polymer having a Tg according to the Fox equation of at least 25° C., which is typically characteristic of forming hard polymers. For Tg greater than 25° C., typical monomers include: C1–C4 alkyl methacrylates; vinyl aromatic monomers, acrylonitrile monomers, and copolymers thereof. In various embodiments of the present invention, the multimodal polymer particle populations can be prepared with various ethylenically unsaturated monomers in various ratios for the purposes of preparing various "hard" versus "soft", and "brittle" versus "rubbery" polymer phases.

The processes for making two-, and three-particle populations may further contain a third step (c), which involves polymerizing a second group of one or more ethylenically unsaturated monomers in the presence of at least the larger and smaller mode of polymer particles to provide a polymer adjacent to the surfaces of the polymer particles of the larger and smaller modes. In this additional step, the second group of one or more ethylenically unsaturated monomers can be the same as or different from the first group of one or more ethylenically unsaturated monomers. In varying the properties of impact modifiers, for example, one typically controls: degree of crosslinking in the core rubber; degree of graftlinking of polymer shells to underlying phases, such as the core; molecular weight of the polymer shell; and morphology (e.g., a shell or diffusion of particles into the core). In this additional step, the second group of one or more ethylenically unsaturated monomers is polymerized after at least a portion of the first group of one or more ethylenically unsaturated monomers is polymerized. It is within the purview of this invention that any combination of cores, shells, interpolymer phases, monomers, crosslinkers, and graftlinkers is possible for preparing the multimodal polymer particles used in the present invention.

In these embodiments wherein a second group of ethylenically unsaturated monomers is polymerized, it is within the purview of the present invention that the second group of monomers is polymerized after substantially all of the first group of monomers is polymerized. This step is useful for controlling morphology.

In preparing a multimodal polymer particle dispersion used in the present invention, the first group of monomers forms a rubbery core polymer and the second group of monomers forms a hard shell polymer. Rubbery core monomers include, for example, alkyl acrylates. The rubbery core monomers may also include 1 percent to 5 percent, based on total monomer weight, of one or more crosslinkers. In the case where the rubbery monomers include diene monomers, crosslinker may not be necessary as diene monomers tend to self-crosslink. Such self-crosslinking depends on the reaction conditions and post-reaction conditions as known in the art. The hard shell monomers may contain, as a specific example, methyl methacrylate and styrene.

Oftentimes, in making core/shell type polymer particles, the second group of monomers can be added to the reaction mixture before the first group has been completely polymerized so that both monomers from the first and second groups are simultaneously present in the reaction mixture. In this situation, while the second group of monomers may not necessarily copolymerize with the unpolymerized monomers from the first group, it is desirable that at least a portion of the second group of monomers copolymerizes with a portion of the unpolymerized monomers from the first group of monomers. Likewise, it is desirable that at least a portion of the second group of monomers copolymerizes with substantially all of the unpolymerized monomers from the first group of monomers. This process can be controlled by comparing the reactivity ratios of monomers, as known in the art, for preparing separate, alternating, blocky, or random copolymers, as well as combinations thereof.

With regard to one specific example wherein the multimodal polymer particle dispersion is in an emulsion form, reactants (e.g., monomers, initiators, emulsifiers, and optional chain transfer agents, etc.) are typically combined in a reactor with a liquid medium (e.g., an aqueous medium) to form a mixture. Thereafter, and/or simultaneously therewith, the mixture is reacted while in the presence of the liquid medium. The reactants can be added slowly (gradually, as in a semi-batch process), over time, continuously, or quickly as a "shot" or "multi-shot" into the reactor. Emulsion polymerization techniques for preparing polymer particles are typically carried out in a suitable reactor wherein the reactants (monomers, initiators, emulsifiers, pH buffers, salts, acids, bases, optional chain transfer agents) are suitably combined and mixed, and reacted in an aqueous medium, and wherein heat may be transferred in to, and away from, the reaction zone.

In another specific example wherein the multimodal polymer particle dispersion is in an emulsion form, the process encompasses at least the following steps. First, an aqueous emulsion polymerization reaction mixture is provided that includes a first and second population of polymer particles. These polymer particles as provided for in the reaction mixture are typically referred to by those skilled in the art of emulsion polymerization as "polymer seed particles", "seed particles", or simply "seed". It is also known to those skilled in the art that polymer particles formed in one step may be further used as seed particles in another step. Then, a first group of one or more ethylenically unsaturated monomers is polymerized in the aqueous emulsion such that the mean particle sizes of the first and second populations of polymer particles differ from each other by at least 50 percent. After the polymer particle populations are provided for in a reaction mixture, monomers are subsequently added in order to provide for "grow out" of one or both of the polymer seed particle populations. In this embodiment, when both seed particle populations "grow out", this grow-out can occur simultaneously or at different times.

Methods for polymer seed grow out are useful for preparing polymer particles having a particle size in the range of from 10 nm to 1,000 nm. Typically, monomer and initiator are added to the reaction mixture at conditions to initiate and polymerize monomer as it is added to the reaction mixture. Typically, the polymer particle size will increase with increasing seed size. Accordingly, the seed size range can vary from 10 nm to 1,000 nm. In this embodiment, the seed size is typically at least 30 nm, more typically at least 70 nm, and most typically at least 100 nm.

One specific example of providing multimodal polymer particle dispersions of the present invention is where a single polymer seed and excess surfactant is provided into the reaction mixture so that upon addition of monomer, a second population of polymer particles is formed. In this example, the amount of excess surfactant that is required to form the second population of polymer particles will vary with the type of surfactant, and conditions of the reaction media to form micelles. Subsequent or simultaneous addition of monomer and initiator into the reaction mixture thereby forms the second population of polymer particles. This is followed by at least one additional "grow out" step as described above. Further steps providing additional populations of seed particles followed by grow-out are also within the scope of the present invention.

Another specific example is providing seeds of two or more sizes, followed by a swelling process. Seeds of two or more sizes can be provided as previously described. The swelling process typically involves adding emulsified monomers, or mixtures of monomers to seed particles present the aqueous reaction media so that the seed particles swell with monomer prior to forming polymer. The initiator is typically present in the monomer mixture or subsequently added to the reaction mixture. Then, the monomers are polymerized after swelling. By this process, there is no limitation to the upper size of the mean polymer size.

In a specific example, high-solids multimodal polymer particle dispersions containing up to 94 weight percent rubbery component, based on total weight polymer particles, can be readily spray-dried into a compaction-free powder. In this example, high-solids multimodal polymer particle dispersions are provided using two rubbery seed particle populations in a reaction mixture, to which are gradually added an initiator, activator, and emulsified monomers. Preferably, emulsified monomers for forming a hard shell polymer are subsequently gradually added to the reaction mixture. A thermal initiator is used to carry out the reaction at temperatures typically greater than 25 C., more typically greater than 50 C., and even more typically greater than 75 C. The minimum small mode particle size of greater than 200 nm in this specific example is readily achieved when the smaller mode seed particle population has a particle size typically at least 50 nm, more typically at least 75 nm, and even more typically at least 100 nm. The addition of polymerizing monomers onto the seed particles cause the "grow out" of these smaller mode particles to greater than 200 nm. In a similar fashion, the requisite larger mode particle size is readily attained by using a larger mode seed population having a particle size typically at least 60 nm, more typically at least 100 nm, even more typically at least 150 nm. In this example, the relative number fractions of the seeds that are used to make the smaller and larger modes correlate to the desired final smaller mode:larger mode number fractions. The desired final smaller mode:larger mode weight fractions is determined by the relative mass uptakes of each mode. For many of the embodiments of the present invention, the relative mass uptakes for the smaller and larger modes will typically be similar so that the final weight fractions of the modes will be similar to the starting weight fractions of the seed particles.

Another specific example of forming two populations of polymer seed particles is provided where polymer seed particles of a single mode are partially agglomerated (i.e. "microagglomerated", as known in the art). In this example, the seed particles agglomerate to different extents, thereby forming two or more populations of seed particles. Although such microagglomeration steps typically require polymer particle solids levels less than 40 percent, further swelling and grow-out steps applied to such microagglomerated seed particles will result in formation of multimodal polymer particle dispersions having solids fractions at least 40 percent.

Preparing a combination of two polymer particle populations that differ in particle size can be provided using two seeds that vary in particle size, composition, or a combination of both particle size and composition. The final sizes of the particles depend on the starting size and the starting composition of the seeds. If the seeds are the same compositions, then they typically grow and/or swell at similar rates of "mass uptake". The term "mass uptake" refers to the increase in mass of the polymer particles arising from additional monomer and/or polymer.

Extent of mass uptake may be estimated according to polymer thermodynamic principles known to those skilled in the art. For example, if the seed compositions are different, then the rate of mass uptake will generally be different. If the seeds are the same composition but different size, then the larger seed particles will generally remain larger during mass uptake. As well, increasing the molecular weight of the polymer in the seeds generally provides smaller polymer particles. Generally, these and other guidelines for controlling polymer particle size are estimable via equilibrium swelling calculations according to the principles of polymer thermodynamics and reaction kinetics as known to those skilled in the art.

One or more of these methods may be combined to prepare the multimodal polymer particle dispersions of the present invention. Those skilled in the art would be able to readily determine which specific process best suits their needs after reading this specification.

In yet another specific example wherein the multimodal polymer particle dispersion is in an emulsion form, the process encompasses at least the following steps. First, an aqueous emulsion polymerization reaction mixture is provided which includes a first population and second population of polymer particles. Then, a first group of one or more ethylenically unsaturated monomers is polymerized in the aqueous emulsion such that a third population of polymer particles is formed. Formation of the third population can be provided by the addition of excess surfactant to form seed particles as described in a previous embodiment, or they can be added separately. The step of swelling and/or grow-out of the first, second, and/or third population of polymer particles subsequently follows according to the procedures described in a previous embodiment.

These various methods for preparing populations of polymer particles may include one or more of the liquids in the following group: monomers, solvents, non-solvents, chain transfer agents, initiators, surfactants, oils, buffer solutions, stabilizers to prevent polymer particle coalescence, crosslinkers, graft linkers, aqueous phase inhibitors for preventing polymerization in the aqueous phase. Accordingly, the multimodal polymer particle dispersions of the present invention typically include one or more of these liquids.

Examples of polymer particle compositions which are within the scope of the present invention include the following polymer compositions: polymers derived from diene, diene/vinyl aromatic, or crosslinked diene/vinyl aromatic monomers; polymers derived from (C1 to C20) alkyl (meth)acrylates; copolymers derived from (C1 to C20) alkyl (meth)acrylates, (e.g. 2-ethylhexyl acrylate mixed with a butyl acrylate); copolymers derived from (C1 to C20) alkyl (meth)acrylates which vary in comonomer ratio; copolymers derived from (C1 to C20) alkyl (meth)acrylates which vary in comonomer ratio to provide for differences in glass transition temperatures, e.g. high Tg (greater than 75 C.) polymer and low Tg polymer and ( less than 0 C.); ethylene-vinylacetate ("EVA") type copolymers; chlorinated polyethylene ("CPE"); polymers derived from olefins; copolymers or blends containing copolymers derived from (C1 to C20) alkyl (meth)acrylates mixed with EVA or chlorinated polyethylene ("CPE") or polyolefins.

One specific example of different compositions of polymer particles is when a balance of impact efficiency and UV resistance is desired. In this case, different compositions can be provided by the following process: emulsion blend of a diene-containing impact modifier with an acrylic-based impact modifier.

One specific example of different types of multimodal polymer particles is where the larger and smaller modes are useful as impact modifiers and the additional one or more populations are useful as processing aids. Combinations of various polymeric additives can be readily prepared by those skilled in the art.

The multimodal polymer particle dispersion may also contain polymer particles to balance impact efficiency and UV resistance. In this case, different compositions can be provided by the following process: emulsion blend of a diene-derived impact modifier with an acrylic-derived impact modifier. For the purposes of preparing high solids, one can start with two diene-derived polymer seed particles varying in size for preparing the larger and smaller modes of polymer particles varying at least 50 percent in size. Diene-type monomers are subsequently polymerized in the presence of these seed particles to form the larger and smaller modes of diene-derived polymer particles. Additional seed particles are either added to or formed in the reaction media containing the larger and smaller modes of diene-derived polymer particles. Subsequently, polymerization of another type of one or more monomers, such as a (C1–C20) alkyl (meth)acrylates form on or in the additional seed particles.

In the multimodal polymer particle dispersion used in the present invention, an additional plastics additive component can be readily incorporated into the particle dispersion by direct addition, emulsification or suspension by suspending agents in water or a suitable solvent, and optionally applying shear. The amount of these optional components can be in the range of from 0 to 100 weight percent; typically from 0 to 20 weight percent; most typically from 0 to 10 weight percent of the liquid component. The amount of emulsion stabilizers can be in the range of from 0 to 100 weight percent; typically from 0 to 5 weight percent; most typically from 0.01 to 2 weight percent of the liquid component. The amount of defoamers can be in the range of from 0 to 100 weight percent; typically from 0 to 10 weight percent; most typically from 0 to 5 weight percent, the weight percentage being based on the water in the dispersion.

In one specific embodiment of the process for preparing multimodal polymer particle dispersions, a dispersion of solid or liquid lubricant particles may also be incorporated in the multimodal polymer particle dispersion by emulsifying the solid or liquid lubricant in water or other non-solvent with a surfactant and shear mixing. The lubricant dispersion is then mixed into the multimodal polymer particle dispersion. In a similar fashion, the solid or liquid lubricant may be emulsified in an emulsion, latex, dispersion, or suspension containing one or more other components of the multimodal polymer particle dispersion as another embodiment. One specific example is where the lubricant may be emulsified by adding a surfactant and shear mixing in a high solids emulsion containing the multimodal polymer particles. In a similar fashion, because thermal stabilizers are mostly provided as liquids, oils, or solids that are typically non-soluble in water, thermal stabilizers may also be emulsified and added to the multimodal polymer particle dispersion according to these procedures. The multimodal polymer particle dispersion may also contain stabilizers and lubricants that can be incorporated into the water component using organic solvents. Because stabilizers and lubricants are typically insoluble in water, they may be incorporated into the liquid component of the multimodal polymer particle dispersion by using organic solvents and/or surfactant to help dissolve or disperse them. In this regard, various solvent/oil/aqueous/surfactant combinations may be employed to provide dispersions or solutions of one or more additives, such as stabilizers and lubricants, in the water component of the multimodal polymer particle dispersion.

Oils which can be used in various embodiments of the present invention include, liquid polymers, mineral oils, polymers which have a weight average molecular weight (Mw) of 5000 or less comprising polybutene, polydimethylsiloxane, polypropylene, polybutadiene, polyisoprene, preferably the polybutene has a Mw of 300–1500 and the polydimethylsiloxane has a Mw of 900–3100; alkylacrylates having an alkyl group containing 12 or more carbon atoms such as stearyl (meth)acrylate, lauryl (meth)acrylate; esters containing carboxylic acids or alcohols with 12 or more carbon atoms, for example, methyl stearate, ethyl stearate, butyl stearate, stearyl citrate; vegetable oils such as sunflower oil, peanut oil or olive oil; marine oils such as cod liver oil; industrial oils like, castor oil and linseed oil; soybean oil; palm oil such as coconut oil and animal fats such as tallow.

In certain embodiments of the present invention, one or more oils can be added to the compositions for improving the impact strength and processability of matrix resin blends. In these embodiments, it is preferred to incorporate mineral oil in the processes and compositions of the present invention. Various mineral oils can be used, which include both "light" (e.g., molecular weights less than about 550 g/mol) and "heavy" (e.g., molecular weights greater than about 550 g/mol) mineral oils. If the molecular weight of the mineral oil is too low, then the mineral oil will vaporize too easily. Accordingly, it is desirable that the flash point of the mineral oil be kept lower than the temperature at which the composition containing the oil is subsequently processed. The mineral oil is typically chosen so that it is at least partially soluble in the polymer particles of the present invention. In these embodiments, the compositions of the present invention may contain up to 25 weight percent, typically up to 15 weight percent, and more typically up to 10 weight percent of a mineral oil, based on total weight of polymer particles.

When used as impact modifiers, the compositions of the present invention may be used in various ways, including the preparation of novel polymeric composition blends that include a matrix resin component and a core-shell impact modifier component. The blends of the present invention contain a matrix resin and an impact modifier powder of the present invention, wherein the weight ratio of the impact modifier to the resin is in the range of from 1:99 to 99:1. These blends can be readily prepared using blending methods that are known in the art of plastics processing. For example, the multimodal polymer particles in the form of powders can be blended with thermoplastic resin powders or pellets and melt processed using an extruder. In addition, the multimodal polymer particles in the form of dispersions can be first blended with thermoplastic resin powders or pellets in a powder mixing operation whereby a portion of the water evaporates prior to, or simultaneously with, melt processing using an extruder.

The blends of the present invention are especially useful as impact-modified thermoplastics when the weight ratio of solids portion of the additive to resin is in the range of from 3:97 to 30:70. The blends of the present invention can also be blended with higher amounts of the powders of the present invention for preparing concentrated pellets of the impact modifiers of the present invention.

The blends of the present invention may also be formed into pellets by the steps of blending, extruding and pelletizing using conventional plastics processing equipment. Such pellets may readily contain the impact modifier powders of the present invention and one or more resins in the weight ratio of powder to resin can be in the range of from 10:90 to 80:20.

The blends of the present invention have many uses, including calendered sheet, thermoformed sheet, injection molded articles, blow-molded articles, extruded articles. When the refractive index of the impact modifier is carefully matched to that of transparent resins, the resulting impact modifier is useful in applications requiring transparency.

The impact modifiers of the present invention are typically blended into poly(vinyl chloride) ("PVC") and chlorinated PVC ("CPVC") to improve impact strength. The impact modifiers of the present invention are especially useful for manufacturing PVC siding, window profiles, and other exterior building products where both impact strength and weatherability of the PVC product are needed. The impact modifiers are useful for preparing PVC siding when the impact modifier is present in the PVC formulation in the range of from 4 to 20 parts per hundred resin ("PHR").

The impact modifier powders may be blended into many resins other than PVC, including thermoplastics based on polymers and copolymers of alkyl (meth)methacrylate, vinyl aromatics (e.g., styrene), and/or (meth)acrylonitrile, aromatic polyesters such as poly(ethylene terephthalate) or poly(butylene terephthalate), polycarbonates, polyamides, polyacetals, and polyolefins. The impact modifiers may be admixed with various blends and alloys of one or more of these thermoplastic resins. The utility of such blends is varied, but include articles used in building and construction industries, such as vinyl siding and window profiles, equipment panels and housings, such as for appliances or computers, and automobile parts such as door panels and bumpers. The impact modifiers may also be admixed with thermosetting resins.

EXAMPLES

The abbreviations listed below are used throughout the examples:

| | |
|---|---|
| MMA = | Methyl Methacrylate |
| BA = | Butyl Acrylate |
| SLS = | Sodium Lauryl Sulfate |
| ALMA = | Allyl Methacrylate |
| t-BHP = | tertiary-butyl hydroperoxide |
| SFS = | sodium formaldehyde sulfoxylate |
| NaPS = | Sodium Persulfate |
| Na2SO4 = | Sodium Sulfate |
| DI = | deionized |
| wt percent = | percent by weight on total monomer |
| ppm = | parts per million on total monomer |
| nm = | nanometers |
| C = | degrees Celsius |
| EMM = | emulsified monomer mix |
| RPM = | revolutions per minute |

Example 1

Heated, deionized water, (1145.37 g), at 88° C. was charged to a stainless steel reactor and stirred with an agitator stirrer. The reactor was sparged with nitrogen gas for 15 minutes and then subsequently swept with nitrogen. Acetic acid (2.24 g) was added to the reactor. A larger seed latex polymer (214.82 g total latex at 45.06% polymer solids, particle size 330 nm) and a smaller seed latex polymer (1606.16 g total latex at 54.24% polymer solids, particle size 100 nm) were added to the reactor. t-BHP initiator (4.5 grams of 70% t-BHP dissolved in 45 grams of water) and SFS activator initiator (4.6 grams of 78% SFS dissolved in 115 grams of water) were then added. The polymerization was commenced by starting three simultaneous feeds to the reactor. The feed time for all three feeds was 120 minutes. One feed contained an EMM, 9639 grams total, including EMM additive SLS J, below, consisting of 7335.49 g of BA, 51.71 g of ALMA, 131.13 g of 28% SLS in water, and 1952.44 g of DI water. A second feed contained t-BHP initiator solution (2.05 g of 70% t-BHP in 210.26 g DI water). The third feed contained an SFS solution (4.16 grams of 78% SFS dissolved in 208.00 g of DI water). The flow rate for the EMM was 80.3 g/minute. The flow rates for the other feeds (SFS, and t-BHP) were 1.77 g/minute. The reaction temperature was maintained at 85° C. After 10 minutes of feeds, the EMM SLS (J, 152.96 g total of 28% SLS in water and 15.30 g of DI water rinse) was added to the EMM feed tank. At the end of the feeds, the EMM feed line was rinsed with 147.74 g of DI water to the reactor and additional SLS (406.26 g total of 28% SLS in water and 40.63 g of DI water rinse) was added batch-wise to the reactor. t-BHP (2.30 g of 70% t-BHP in 70.77 g DI water) and SFS (1.78 grams of 78% SFS dissolved in 71.20 g of DI water), were subsequently added to the reactor as 30 minute feeds, each at a rate of 2.44 g/minute. At the end of this rubber stage (core), the sample was sampled for percent total solids. The actual solids were 59.82% and the theory was 60.68%.

A second stage polymerization was carried out to form a polymer shell on the rubbery core by first lowering the reaction temperature to 52° C. The MMA monomer was added as a neat batch-wise charge (1834.06 g MMA, followed by a 91.70 g DI water rinse). The stage II NaPS (1.52 g of NaPS in 60.80 g DI water) and the stage II SFS (1.52 grams of 78% SFS dissolved in 60.80 g of DI water) were added to the reactor as 30 minute feeds each at a rate of 2.08 g/minute. The stage II chase t-BHP (1.09 g of 70% t-BHP in 43.43 g DI water) and the chase SFS (0.76 grams of 78% SFS dissolved in 43.43 g of DI water), were added to the reactor as 30 minute feeds each at a rate of 1.48 g/minute. At the end of this stage, the reactor mixture was cooled to 40° C. and filtered through cheesecloth into a 5-gallon bucket. The final viscosity as measured by a Brookfield viscometer using a number 3 spindle at 30 RPM was 390 centipoise. The resulting multimodal polymer dispersion contained 63.5 weight percent solids fraction (64 weight percent theoretical), rubbery core comprised 82 weight percent of the total polymer particles, larger mode: particle size was 590 nm, 70 weight percent of total polymer particles, smaller mode: particle size was 270 nm, 30 weight percent of total polymer particles.

Example 2

The multimodal polymer particle dispersion of Example 1 was isolated with a spray dryer. The dispersion was diluted with water to approximately 30 weight percent solids and subsequently spray dried. The inlet and outlet temperatures of the spray dryer were 150° C. and 55° C., respectively. In this manner, the water was flashed off and powder collected (yield of powder: about 98%).

Example 3

The dispersion of Example 1 was spray dried with a flow aid (2 to 3 weight percent based on total solids, Winnofil-S) without prior dilution. The conditions for this method were as follows: inlet temperature=113° C., outlet temperature=67° C.; dispersion feed rate=0.52 liters per minute; flow aid feed rate=20 grams per minute; wheel speed=10,000. Powder properties are provided in Table 1.

Example 4

In this example, mineral oil, (1750 g), (MAPLLC 100 HF Solvent Neutral oil, Marathon Ashland Petroleum LLC, Ashland, Ohio), SLS (28% aqueous solution), (624.8 g) and DI water (455 g) were emulsified with a hand held mixer in a 4-liter container. 1.81 kg of emulsified oil was then mixed with 27.21 Kg of the multimodal polymer particle dispersion of Example 1, and 3.08 Kg of an acrylic high polymer processing aid polymer dispersion (54 weight percent solids). The combined mix of the multimodal polymer particle dispersion, mineral oil emulsion and processing aid dispersion had a viscosity of about 500 centipoise.

Example 5

In this example, the combined mix of the multimodal polymer particle dispersion, mineral oil emulsion and processing aid dispersion according to Example 4 was spray-dried to a powder form according to the method described in Example 3.

Example 6

In another example, the combined mix of the multimodal polymer particle dispersion, mineral oil emulsion and processing aid dispersion is spray dried with a flow aid according to the method described in Example 3. The resulting powder has improved flow and compaction compared to a similar powder composition prepared without the flow aid. Powder properties are provided in Table 1.

TABLE 1

| | | Powder Properties | | | | | |
|---|---|---|---|---|---|---|---|
| | Moisture | Bulk Density (g/cc) | | Powder Particle Size (Coulter) | | | Funnel Flow |
| Example | Content % | Loose | Tapped | Mean | Median | Span | seconds |
| Ex. 3 | 0.6 | 0.580 | 0.678 | 93 | 104 | 1.09 | 12.0 |
| Ex. 6 | 0.6 | 0.554 | 0.620 | 90 | 101 | 1.2 | 15–20 |

Example 7

The powders of Examples 3 and 6 (4.5 PHR) were used as impact modifiers and blended with PVC resin according to the following PVC siding substrate masterbatch formulation:

| Component | Parts by weight (PHR) |
|---|---|
| Resin, PVC (Geon 103, K = 68): | 100 |
| Thermal Stabilizer, ADVASTAB TM-181 (Rohm and Haas) | 0.9 |

-continued

| Component | Parts by weight (PHR) |
|---|---|
| Lubricant, Wax-165 (Allied Chemical) | 0.9 |
| Lubricant, Calcium Stearate | 1.4 |
| Lubricant, PE Wax | 0.1 |
| Filler, calcium carbonate (Omya UFT) | 10 |
| Pigment, TiO2 | 1.0 |
| Processing Aid, PARALOID K-120N (Rohm and Haas) | 0.5 |
| Impact Modifier Powder | 4.5 |

The PVC masterbatch was melt-extruded using a CM-35 extruder (Cincinnati Milacron, Ohio) into sheet having a thickness of 1.2 mm. Impact performance of the sheets was tested by the drop-dart method (3.6 kg dart dropped from 62.2 cm height, ASTM Method D4226). The sheets prepared using each of the multimodal particle powders of Example 1 and Example gave a drop-dart result of 13 passes out of 24 tested. Here, "pass" means did not tear or break. In comparison, a sheet prepared without the multimodal polymer powders results in zero, or at best one, "pass" out of 24 tested. As a result, the multimodal polymer particle powders of the present invention are useful as impact modifiers for plastic resins.

We claim:

1. A process for preparing a multimodal polymer particle composition, comprising the steps of:
   (I) providing a multimodal polymer particle dispersion, said dispersion comprising:
      (a) a larger mode of polymer particles which are core-shell polymer particles, and
      (b) a smaller mode of polymer particles which are core-shell polymer particles,
      wherein the mean particle size of the larger mode of polymer particles is at least 50 percent larger than the mean particle size of the smaller mode of particles, said smaller mode of polymer particles having a mean particle size of greater than 200 nm, and wherein said polymer particles have a total rubbery weight fraction of from 70 to 90 weight percent, based on the total weight of the larger and smaller modes of polymer particles; and
   (II) drying the multimodal polymer particle dispersion.

2. A process for preparing a multimodal polymer particle composition as recited in claim 1, wherein the multimodal polymer particle dispersion further comprises up to 20 weight percent, based on total weight of polymer particles in the multimodal polymer particle dispersion, of a third population of polymer particles having a mean particle size smaller than 200 nm and which are core-shell polymer particles.

3. A process for preparing a multimodal polymer particle composition as recited in claim 1, wherein the multimodal polymer particle dispersion further comprises at least one oil.

4. A process for preparing a multimodal polymer particle composition as recited in claim 3 wherein the at least one oil is selected from the group consisting of mineral oils, polymers having a weight average molecular weight (MW) of 5000 or less; alkylacrylates having an alkyl group containing 12 or more carbon atoms; esters containing carboxylic acids or alcohols with 12 or more carbon atoms; vegetable oils; marine oils; industrial oils; palm oils and animal fats.

5. A process for preparing a multixnodal polymer particle composition as recited in claim 3, wherein the at least one oil is provided in the form of at least one oil-in-water emulsion.

6. A process for preparing a multimodal polymer particle composition as recited in claim 3, wherein the at least one oil is added to the multimodal polymer particle dispersion.

7. A process for preparing a multimodal polymer particle composition as recited in claim 1, wherein the multimodal polymer particle dispersion is spray dried in step.

8. A process for preparing a multimodal polymer particle composition as recited in claim 7, wherein the multimodal polymer particle dispersion is spray dried in the presence of at least one flow aid.

9. A process for preparing a multimodal polymer particle composition as recited in claim 1, wherein the viscosity of the multimodal particle dispersion is less than 2000 centipoise.

10. A process for preparing a high-rubber, high-solids multimodal polymer particle powder, comprising the steps of:
   (I) preparing a high-rubber high-solids multimodal polymer particle dispersion using a gradual addition polymerization method, said dispersion comprising:
      (a) a larger mode of polymer particles which are core-shell polymer particles, and
      (b) a smaller mode of polymer particles which are core-shell polymer particles,
      and wherein said polymer particles have a the total rubbery weight fraction of from 70 to 95 weight percent, based on the total weight of the larger and smaller modes of polymer particles
      wherein the total solids weight fraction of the dispersion is at least 50 weight percent,
      and wherein the mean particle size of the larger mode of polymer particles is at least 50 percent larger than the mean particle size of the smaller mode of particles; and
   (II) spray-drying the multimodal polymer particle dispersion to a compaction-free powder.

* * * * *